Figure 1:
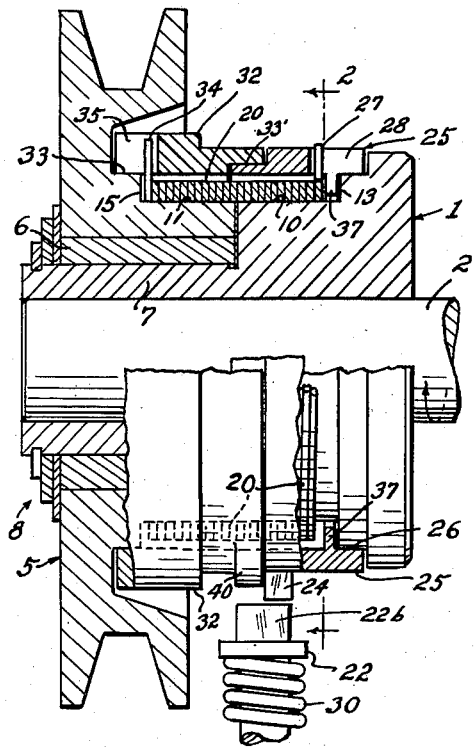

April 8, 1958 C. R. SACCHINI ET AL 2,829,748

SPRING CLUTCH MECHANISMS

Filed Jan. 30, 1957

INVENTORS
COLUMBUS R. SACCHINI
DONALD R. TOMKO
BY
ATTORNEY

United States Patent Office 2,829,748
Patented Apr. 8, 1958

2,829,748

SPRING CLUTCH MECHANISMS

Columbus R. Sacchini, Willoughby, and Donald R. Tomko, Cleveland, Ohio, assignors to Curtiss-Wright Corporation, New York, N. Y., a corporation of Delaware Application January 30, 1957, Serial No. 637,248

6 Claims. (Cl. 192—26)

The invention relates to a coil or spring clutch mechanism adapted for use with a continuously rotated drive shaft to produce intermittent drive of the output mechanism at the will of an operator or through automatic control means. Such spring coil clutch mechanisms are self-energizing which is to say that one or more coils at one end of the spring associated with an input clutch drum is or are preloaded as by interference fit on that drum and one or more coils at the opposite end of the spring is or are reactively connected to the output drum so that the spring automatically grips the input and output drums whereby to transmit substantial torque in one direction only. Clutch disengagement is effected by arresting the rotation of one or more of the input-drum-associated coils. If an end coil of the spring associated with the output drum is attached to that drum and the connected load has sufficient inertia then, during clutch disengagement, coils of the spring will be forced to move out of gripping relationship to the input drum.

In spring clutches as outlined above, if the load has insufficient inertia or too much built-in frictional restraint to overrunning movement during the clutch disengaging operation, the input-drum-associated coils will not be moved completely out of contact and will continue to drag on the input drum. Further, in installations having sufficient output-connected inertia to insure full release of the input-drum-associated coils, unless antirotational means connected to the output are provided to prevent recoil action on part of the clutch spring, then the spring itself can and frequently will cause reseating of its coils on the input drum. Incidentally if the load has considerable and dependable inertia and the output drum is positively connected with its associated spring coils special provision must usually be made to prevent excessive uncoiling movement of the clutch spring such as could damage it; and if such provision is made then the clutch disengaging operation is almost certain to be accompanied by shock to part or all of the mechanism. When continued frictional drag, as by such reseating of input-drum-associated coils as mentioned above, occurs, the clutch experiences undue heating: a phenomenon known as fretting corrosion is quite apt to result, and the drag produces destructive wear and undesired noise.

The present solution to the problems indicated above is to provide, within the clutch mechanism itself and independently of output characteristics, an inertia member connected to the output-drum-associated coils of the spring and with sufficient mass and free turning capability as to insure definite uncoiling of the spring from the input drum during clutch disengagement and further to provide means to prevent such retrograde or recoil movement of the inertia member as can permit reseating of the input-drum-associated coils. The invention further enables a single stopping or control member to produce clutch disengagement and also latching of the spring in drum disengaged position. Other novel features will be referred to later herein.

Figure 2:
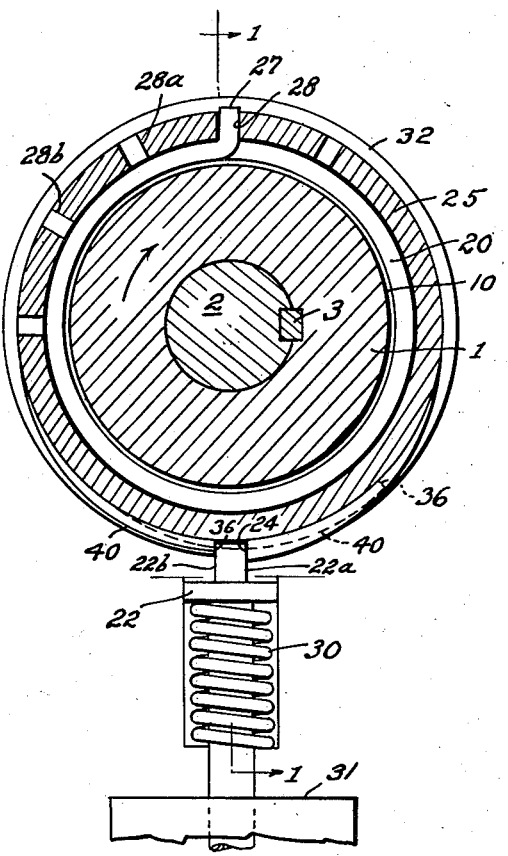

In the drawing, Fig. 1 is a longitudinal central cross-sectional view of the present clutch mechanism in one form and Fig. 2 is a transverse mainly cross-sectional view taken as indicated by the line 2—2 on Fig. 1.

In the drawing a suitable input drum member 1 is assumed to be supported by the normally continuously rotated driving shaft 2, via bearings thereof not shown. The drum member 1 is secured to turn with the shaft as by a suitable key 3. The output drum member 5, shown as a hub portion of a pulley coaxial with the input drum member 1, is supported as by a bearing 6 on a tubular portion 7 of the input drum member 1. The drum members are held in association axially by suitable means such as the illustrated snap ring and washer assembly 8 secured to the tubular portion 7 of drum member 1.

The drum surface 10 of input member 1 and the drum surface 11 of member 5 are preferably cylinders of equal diameter formed on the drum members 1 and 2 respectively between oppositely facing axial shoulders 13 and 15 thereof which locate the clutch spring 20 for operation against the drum surfaces 10 and 11. The internal peripheral surfaces of the spring coils, when the spring 20 is in a relaxed condition, are of smaller diameter than those of the drum surfaces 10 and 11 so that each end portion of the spring is self-energizing on a respective drum. Thus the spring 20 is automatically self-gripping to drive the pulley (drum member 5) in the direction of rotation of shaft 2 which, if the spring is left-hand wound, is as indicated by the arrows on Figs. 1 and 2.

Provision for clutch disengagement is, as shown, a stop member such as a suitably supported plunger 22. The right hand face 22a of the plunger, as indicated in Fig. 2, is positioned in the rotational path of a release shoulder 24 on a sleeve 25 supported for free rotation relative to the input drum member 1 and concentric therewith as on a circular surface 26 formed on the drum member 1. The plunger 22 is operated into a clutch disengaging position by yieldable means, preferably a coil spring 30 which, as shown, is opposed by a solenoid mechanism 31. The solenoid is energized by current from a suitable source in order to render the clutch mechanism effective to transmit torque. The release sleeve 25 is shown secured to the input-drum-associated end coil of the clutch spring 20 as by means of an outwardly bent toe or tang 27 of the end coil engaged with a notch or recess 28 of the sleeve 25.

The inertia member 32 hereof is shown in the form of a sleeve supported to turn freely on a circular surface 33 of the output drum member 5 and concentric therewith. The two sleeves 25 and 32 are shown in overlapping or telescoping relationship at 33' to provide a free pilot bearing connection between the two sleeves. The internal peripheral surfaces of the sleeves 25 and 32, in the drum-gripping position of the various coils of the clutch spring 20 (Fig. 1), are approximately equally spaced radially from the peripheral external surfaces of the coils. Thereby the sleeves can serve to prevent undesired uncoiling movement of the various spring coils during the clutch disengaging operation to be described presently. The inertia member or sleeve 32 is secured to the endmost output-drum-associated portion of the clutch spring 20 as by engagement of a toe or tang portion 34 thereof into a notch or recess 35 of the inertia sleeve 32.

In operation, it will be apparent that when the stop or plunger face 22a engages the release shoulder 24 of the sleeve 25 the inertia member 32 can overrun the arrested input-drum-associated end portion of the clutch spring 20 and uncoil the spring from contact with the drum surfaces 10 and 11. The design is such that the overrunning movement of the inertia member 32 carries a latching shoulder 36 of the inertia member from the position thereof shown by dotted lines in Fig. 2, which it occupies during gripping engagement of the clutch spring with the drum surfaces, to a position (not shown) somewhat beyond a latching face 22b of the plunger 22. The clockwise overrun enables the latch surface 36 to come into abutment with the plunger face 22b during subsequent recoil action of the spring in attempting to reseat itself on the clutch drum surfaces 10 and 11.

The use of a single plunger or the like to effect disengagement of the clutch and latching of the clutch spring 20 in drum-releasing position is enabled as shown in Fig. 2 by so making the release shoulder 24 of sleeve 25 that it extends farther radially from the drum axis than does the latching shoulder 36 of sleeve 32 and, further, by providing adjacent the latching shoulder 36, clockwise therefrom as shown by Fig. 2, a suitable ramp or cam 40 which recedes gradually toward the drum axis and merges with the external periphery of the sleeve 32. Thus, when the solenoid 31 is deenergized, the upper end of the plunger 22, as shown in Fig. 2, is moved by the spring 30 into full face engagement with the release shoulder 24 of the sleeve 25. Then, while the latching shoulder 36 overruns the arrested end of the clutch spring, the upper end of the plunger is cammed outwardly by the ramp 40, permitting the spring 30 to move the plunger 22 into recoil-preventing engagement with the latching shoulder 36.

The mass of the inertia member 32 is chosen in accordance with the rotational speed of the shaft 2 and in respect to the index or effective resilience of the clutch spring 20 so that the latching shoulder 36 will always overrun the sleeve 25 into latching position.

It is difficult to design clutch springs so that their terminal coil portions at the opposite ends (represented by toes 27 and 34) will always bear a specific angular relationship to each other about the axis of the spring. One way of compensating for this while maintaining a predeterminable angular relationship between the release shoulder 24 of sleeve 25 and the latching shoulder 36 of sleeve 32 prior to clutch disengagement is to provide a series of recesses in one or both of the sleeves (see 28a and 28b, etc. of sleeve 25, Fig. 2). Thereby the appropriate recess is selected to receive the spring toe so that when the spring is contracted against the drum surfaces 10 and 11 the latching shoulder 36 will be in appropriate trailing relationship to the release surface 24 in reference to the direction of rotation.

It will be apparent from the above that the driven or output drum member 5 and its connected mechanism can come to a dead stop as soon as the plunger 22 engages the release shoulder 24, yet nevertheless the clutch spring will be expanded and latched clear of its associated clutch drums. Furthermore, the load can have any desired amount of free overrun, and not necessarily any particular amount, without adversely affecting the clutch spring expanding and latching operation.

While the clutch stopping and inertia-member-latching surfaces 22a and 22b respectively are carried on a common member, thus economizing in construction, separate members (not shown) with appropriate stop and latching faces can be provided for engagement with the sleeve shoulders in which case, of course, the rotational planes of the sleeve shoulders would usually be farther apart than as herein shown.

Since the clutch spring 20 has no connection other than frictional with the drum surfaces 10 and 11, it can move axially of those surfaces, particularly when all its coils are latched out of contact with the drum surfaces during clutch disengagement, as described above. It is advisable to prevent axial contact between the arrested clutch spring 20 and the rotating input drum member 1, as with the shoulder 13 thereof. Annular rib 37 on the release sleeve 25 prevents such contact.

We claim:
1. A coil clutch mechanism, comprising an input clutch drum adapted to be unidirectionally driven at a predetermined speed, an output clutch drum coaxial therewith, a helical clutch spring having coil portions resiliently preloaded radially against respective drums and being otherwise unconnected with the drums so that the spring is self energizing in order to drive the output drum at such speed, a release shoulder connected with an input-drum-associated coil of the spring and facing circumferentially of the spring in the driving direction, clutch disengaging means including a stop movable into engagement with the release shoulder to disengage the clutch mechanism, an inertia member connected to an output-drum-associated coil of the spring and supported for free rotation about the axis of the drums relative to both drums, the inertia member having sufficient mass in relation to such predetermined speed to enable it to rotate relative to the stop and move the input-drum-associated coils radially away from the input drum after the release shoulder is arrested by the stop, the inertia member having a shoulder facing circumferentially oppositely of the driving direction, and the clutch disengaging means further including latching surface means disposed for engagement and engageable with the shoulder of the inertia member in a manner to prevent sufficient recoil movement of the inertia member as to permit partial or complete reengagement of the input-drum-associated coils with the input drum.

2. The clutch mechanism according to claim 1, wherein the clutch drums have external peripheral surfaces on which the clutch spring coils are respectively preloaded, the release shoulder projects from a sleeve surrounding the spring and supported on a circular surface portion of the input drum for rotation relative thereto and being connected to an input-drum-associated end coil portion of the spring, the inertia member is a sleeve similarly supported on the output drum for rotation relative thereto and being connected to an output-drum-associated end coil portion of the spring, and the shoulder of the inertia member projects from the second mentioned sleeve.

3. The clutch mechanism according to claim 2, wherein an internal peripheral surface of the first mentioned sleeve is spaced radially from adjacent external surfaces of the clutch spring when the spring is contracted to transmit torque, thereby serving as a limit stop for uncoiling movement of the input-drum-associated coils during disengagement of the clutch mechanism.

4. The clutch mechanism according to claim 2, wherein one end coil of the spring has a projection thereon engageable selectively with one of a series of receiving recesses in its associated sleeve to enable adjustment of the normal angular relationship of the two shoulders when the clutch spring is in a relaxed state.

5. The clutch mechanism according to claim 2, wherein the relatively adjacent axial end portions of the two sleeves are relatively overlapped, to shroud the spring and provide a pilot bearing relationship between the sleeves.

6. A coil clutch mechanism, comprising an input external clutch drum adapted to be continuously driven at a predetermined speed, an output external clutch drum coaxial therewith, a helical clutch spring embracing the drums and having coil portions at its opposite ends resiliently preloaded against respective drums so that the spring automatically grips the drums in the driving direction of the mechanism, a release shoulder connected with an input-drum-associated coil of the spring and facing circumferentially in said driving direction, clutch disengaging means including a stop element yieldingly movable radially toward the drum axis to position a stop surface thereof into the path of rotation of the release shoulder, an inertia ring member connected to an output-drum-associated coil of the spring and supported for free rotation coaxially of the drums relative to both drums, the inertia member having sufficient mass in relation to such predetermined speed to enable it to unwind the input-drum-associated coils clear of the input drum when rotation of the spring is arrested by said stop surface, the inertia member having a shoulder extending a less distance from the drum axis than does the release shoulder and facing oppositely of the driving direction, the inertia member having a ramp surface contiguous to its shoulder in the plane of rotation thereof and receding inwardly from the outermost limit of the shoulder toward the drum axis forwardly of the shoulder in the driving direction, whereby the stop element can be moved gradually radially outwardly by the inertia member into position to latchingly engage the shoulder of the inertia member.

References Cited in the file of this patent

UNITED STATES PATENTS

| | | |
|---|---|---|
| 1,762,799 | Starkey | June 10, 1930 |
| 1,846,696 | Starkey | Feb. 23, 1932 |
| 2,298,970 | Russell et al. | Oct. 13, 1942 |